United States Patent [19]

Smith et al.

[11] Patent Number: 6,130,009
[45] Date of Patent: Oct. 10, 2000

[54] APPARATUS AND PROCESS FOR NOZZLE PRODUCTION UTILIZING COMPUTER GENERATED HOLOGRAMS

[75] Inventors: Adlai H. Smith; Bruce B. McArthur, both of San Diego; Robert O. Hunter, Jr., Rancho Santa Fe, all of Calif.

[73] Assignee: Litel Instruments, San Diego, Calif.

[21] Appl. No.: 08/177,108

[22] Filed: Jan. 3, 1994

[51] Int. Cl.[7] .................................................. G03H 1/00
[52] U.S. Cl. ................. 430/1; 430/2; 430/5; 430/945; 430/322; 219/121.7; 219/121.71; 219/121.82
[58] Field of Search .................. 430/1, 2, 5, 22, 430/322, 323, 945; 219/121.7, 121.83, 121.82, 121.71; 347/47

[56] References Cited

U.S. PATENT DOCUMENTS

| | | | |
|---|---|---|---|
| 3,537,854 | 11/1970 | Grobin, Jr. et al. | 430/1 |
| 4,014,029 | 3/1977 | Lane et al. | 347/47 |
| 4,508,749 | 4/1985 | Brannon | 430/945 |
| 4,923,772 | 5/1990 | Kirch | 430/5 |
| 5,189,437 | 2/1993 | Michaelis et al. | 219/121.7 |
| 5,237,148 | 8/1993 | Aoki et al. | 219/121.7 |
| 5,294,567 | 3/1994 | Darfman et al. | 437/187 |
| 5,302,798 | 4/1994 | Inagawa et al. | 219/121.7 |
| 5,305,018 | 4/1994 | Schantz et al. | 347/47 |
| 5,328,783 | 7/1994 | Smith et al. | 430/2 |
| 5,362,940 | 11/1994 | MacDonald et al. | 219/121.83 |
| 5,389,954 | 2/1995 | Inaba et al. | 347/47 |

FOREIGN PATENT DOCUMENTS

| | | | |
|---|---|---|---|
| 0420574 | 4/1991 | European Pat. Off. | 430/22 |
| 0501302 | 9/1993 | European Pat. Off. | 430/22 |

OTHER PUBLICATIONS

Lee, Wai–Hon (1974) "Binary Synthetic Holograms", *Applied Optics*, 13:1677–1680.

Bachmann, Friedrich G. (1990) "Generation of Blind Via–Holes For A High Density Multi–Chip–Module Using Excimer Lasers", *Materials Research Society Symposium Proceedings*, 158:439–450?.

Sarbach, U., et al. (1993) "Excimer laser based microstructuring using mask projection techniques", *Lambda Highlights*, 40:2–4.

Collier, Robert J., et al. (19_) *Optical Holography*, Chapter 8:179–203.

Caulfield et al. "The Applications of Holography" ©1970 Wiley–Interscience pp 80–83.

*Primary Examiner*—Martin Angebranndt
*Attorney, Agent, or Firm*—Townsend and Townsend and Crew LLP

[57] ABSTRACT

An apparatus and process for generating precision ink jet nozzle arrays in substrates is disclosed. The apparatus includes laser output through an alignment path, power monitor, expansion telescope and scanner. Preferably, beam division optics are used in conjunction with the scanner to divide out a plurality of beams and scan simultaneously a corresponding plurality of computer generated holograms (CGHs). These computer generated holograms are configured and scanned so that the generated image—preferably in the first order of diffraction—produces at least a row of ink jet holes having precision dimension and alignment preferably without optical interference from other diffraction orders. Utilizing the disclosed process and apparatus, a one step system is disclosed for going from a substrate to a finished nozzle array suitable for use with ink jet printers.

15 Claims, 15 Drawing Sheets

APPARATUS AND PROCESS FOR NOZZLE PRODUCTION UTILIZING COMPUTER GENERATED HOLOGRAMS

This invention relates to the processing of materials with real images generated by computer generated holograms (CGHs). More particularly, a specialized process and apparatus is disclosed for the manufacture of so-called ink jet nozzles for use with modern printers.

BACKGROUND OF THE INVENTION

Inkjet technology and the application of inkjet technology to printing is now well known. Ink is delivered through nozzles from the cartridge. Resistors underneath each individual nozzle locally heat the ink which is then ejected through the nozzle and onto the paper. Relative nozzle spacing is a critical parameter. Errors in nozzle to nozzle placement lead to distortions in printed pattern discernable to the eye. The axis of each nozzle must point in same direction to within 1 degree or better. Nozzle shape must also be controlled both for consistency and exact shape so the subsequent ink flow has the desired form. Typical materials for inkjet nozzles are polyimide, stainless steel, and silicon.

The prior art for manufacturing inkjet nozzles can be broadly divided into 4 categories. They are mechanical punching, chemical etching, laser machining with contact masks, and laser machining with imaging systems. We now discuss each in turn.

Mechanical punching is limited to relatively soft materials such as polyimide, and large holes, >0.010". Since inkjet nozzles for future generations are generally smaller than that, punches have little future for nozzle manufacture. Wear on the punches also alters the precise nozzle profile, necessitating frequent resharpening to maintain the profile.

Chemical etching is another technique for nozzle production. By chemical etch we include both wet chemical etch and reactive ion etching (RIE). An etch block is applied to both sides of the surface leaving openings at the nozzle locations. The material is subsequently etched.

FIGS. 1A–1F illustrate the processing steps involved in nozzle fabrication for wet chemical etch. FIG. 1A shows the substrate 11 which is to be patterned with nozzles. FIG. 1B has photoresist 12 applied and then FIG. 1C exposed as at areas 13. Exposed areas 13 are then developed FIG. 1D, leaving openings 14 in the patterned photoresist. In the next step, FIG. 1E material is submersed in a wet etch bath and removed by chemical action in regions 15. After stripping the resist, FIG. 1F, we are left with nozzles 16 in the material. This 6-step process has been illustrated for wet chemical etching where both sides of the material are simultaneously etched. If only a single side is etched, either wet chemical or RIE, the number of steps would be identical.

The large number of steps in this process contributes to yield loss. Controlling the wall slope is very difficult for wet chemical etch. For RIE, wall slope control is generally possible but the batch nature and relative high cost of the equipment generally preclude RIE use. A further difficulty with aqueous chemical etch is the dimensional deformations it induces in polyimide due to water absorption.

Another technique is laser machining utilizing conformal masks. This method is described as it relates to the manufacture of wiring patterns in "Generation of Blind Via-Holes for a High Density Multi-Chip-Module Using Excimer Lasers", F. Bachmann, Materials Research Society Symp. Proc. Vol. 158, 1990. Adapting this technique to nozzle manufacture would entail the 9 step process illustrated by FIGS. 2A–2J. The substrate 21 is coated with photoresist 22, FIG. 2D, exposed in regions 23, FIG. 2C, and developed at regions 23, FIG. 2D. Next, FIG. 2E, a seed layer of metal 27 is sputtered onto the tape and subsequently FIG. 2F plated up to fill in the depressions 28, where the photoresist has been removed. Ideally, plated up metal layer 28 would not cover photoresist 29, but to insure all depressions are filled, some overplating is desirable. Metal layer 28 is then etched back FIG. 2G to expose the photoresist openings 29. Next FIG. 2H, the photoresist is stripped opening up openings 31 in plated up metal 28. A laser beam is then scanned over the surface, plated metal 28 serving as an etch block and openings 35 controlling location and size of the nozzles. The result of laser ablation are nozzles 36.

If instead of polyimide, the material is tougher, like stainless steel, etch barrier would need to be considerably thicker, or, steps 2A–2H must be repeated multiple times until the nozzles are made; this multiplies the total number of steps by the number of repeats. The large number of steps for the basic process contributes to yield loss.

Another disadvantage of this process is the inefficient use of laser light. Since typically <1% of the area has openings 35 for nozzles, a laser beam sweeping over the surface as at FIG. 2G wastes >99% of the light since most of it is intercepted by etch block 30. This inherent inefficiency leads to lower process throughput. Also, the large area scanned by the laser beam coupled with the inherent inefficiency of the process leads to local heating of material which can result in thermal damage. A further draw back of this process is that the openings 35 permit limited latitude for wall shape control since they can modulate the intensity pattern only in an on/off fashion; no variation of intensity level (grey level) is possible.

Another technique for manufacturing inkjet nozzles are projection imaging systems for direct etching. A mask in the form (possibly magnified) of the desired image is projected onto the workpiece by imaging optics. The imaging optics are low (de)magnification, typically 1×–5×, and have a field of view larger than the pattern of interest. This is a single step process. Nozzle substrate is directly machined forming nozzles in the locations dictated by the mask. This approach is described in "Excimer Laser Based Microstructing Using Mask Projection Techniques", U. Aarbach, H. Kahlert, Lambda Highlights, No. 40, Pg. 2, April 1993, and "Patterning of Polyimide Films with Ultraviolet Light", U.S. Pat. No. 4,508,749. J. Brannon, J. Lankard, April 1985. Because of the small open area of most nozzle arrays, only a small fraction of the light incident on the mask ultimately performs useful work removing material for nozzle. Said differently, the actual area of the nozzles is small compared to the imaged area of the mask, so that when the mask is illuminated only the light incident on the part of the mask defining the nozzles is actually used; the rest is thrown away. The result is inefficient use of light and therefore lower machine throughput for a given laser power.

Another limitation of imaging techniques is field of view. For 1×–5× reduction systems, fields of view <5 mm are relatively common, while larger fields of view become increasingly difficult to obtain. In addition to the difficulties associated with obtaining large fields of view, the imaging optics must be designed to withstand the high peak and average power levels associated with direct machining. Optical coating damage and bulk changes in refractive index are problems associated with this approach. Dielectric 1× masks, as described in "Excimer Laser Based Microstructing Using Mask Projection Techniques", U. Aarbach, H.

Kahlert, Lambda Highlights, No. 40, Pg. 2, April 1993, and "High Energy Laser Mask and Method of Making Same", U.S. Pat. No. 4,923,772. S. Kirch, J. Lankard, K. Smith, J. Speidell, J. Yeh, May 1990 must be capable of withstanding the power levels and are therefore limited in their scope of use. Dielectric masks are further limited to allowing only light intensity passing to take only two values, that is no intensity what so ever and the full illumination intensity. Having only two values available for the intensity level allows for limited latitude in adjusting the intensity profile on the workpiece, thereby influencing the nozzle wall slope. Uncoated 1× masks as described in "High Power Phase Masks for Imaging Systems", A. Smith, R. Hunter. U.S. patent application Ser. No. 07/833,939 filed Feb. 10, 1992 now U.S. Pat. No. 5,328,785 issued Jul. 12, 1994. and as used in Apparatus and Process for Fine Line Metal Traces, U.S. patent application Ser. No. 08/058,906 filed May 6, 1993 now U.S. Pat. No. 5,364,493 issued Nov. 15, 1994, can withstand substantially higher fluences, but require special, low angle condenser optics. Still, at the highest fluences (~40 J/cm²@248 nm for stainless steel), even these masks are damaged in a 1× imaging geometry. To minimize mask damage problems, reduction systems—typically 5×—are used. Then, with 25× less power per unit area on the mask, mask damage problems are minimized but mask cost is increased because 25× more area is written. However, going from a 1× to 5× lens design substantially increases the difficulty in both design and fabrication of the imaging optics. Practical limits on available mask size also limit field size.

SUMMARY OF THE INVENTION

An apparatus and process for generating precision ink jet nozzle arrays in substrates is disclosed. The apparatus includes laser output through an alignment path, power monitor, expansion telescope and scanner. Preferably, beam division optics are used in conjunction with the scanner to divide out a plurality of beams and scan simultaneously a corresponding plurality of computer generated holograms (CGHs). These computer generated holograms are configured and scanned so that the generated image—preferably in the first order of diffraction—produces at least a row of ink jet holes having precision dimension and alignment preferably without optical interference from other diffraction orders. Utilizing the disclosed process and apparatus, a one step system is disclosed for going from a substrate to a finished nozzle array suitable for use with ink jet printers.

The preferred embodiment uses an excimer laser as a coherent source. Emitted laser light is then expanded and divided up into several channels which are then parallel transported over a computer generated hologram (CGH). Because parallel, low power density light is used almost everywhere in the beamtrain, the layout, size and configuration is adaptable to a wide variety of different installations. The tool can be configured to handle material in continuous reel form or in discrete form.

The optical plate is a computer generated hologram. The CGH is capable of holding the patterns for many nozzle arrays and produces an image on the workpiece with very accurate nozzle to nozzle spacing. This is useful if the substrate is dimensionally stable, enabling multiple nozzle arrays to be either simultaneously or sequentially fabricated in required precision side-by-side alignment. Alternately, and especially when the workpiece is not dimensionally stable, multiple plates, each one individually registered to the apparatus, can have nozzles sequentially configured therein.

Advantages

The exact intensity profile constituting the working image can be precisely varied to produce desired wall slope. Precise wall slope is controllable. Because the CGH enhances the light intensity, it can create very high peak intensities (>10 gigawatts/cm² over a 10 nanosecond pulse) on the work surface. Furthermore because of its flexibility in workpiece location, if there is known topography or curvature associated with the workpiece, it can be accommodated in the hologram design.

The process is an extremely simple one. Once the workpiece has been registered to the CGH, it's surface is machined or otherwise patterned. The result is a one step process going from the bare surface to a finished nozzle array product. Subsequent cleaning of the surface may be necessary. However in the case of polyimide, no cleaning is required if it is processed in a helium or sufficiently high vacuum environment.

The disclosed apparatus and process allows creating small (<10 microns) and large (>3 mm) nozzles. It is not limited to soft materials; tough materials such as alumina, silicon and stainless steel can be patterned.

The optical tooling here utilized effectively does not wear out. Furthermore, over prior art chemical and laser processes the disclosed single step process has higher yield.

Hazardous and difficult to control chemicals such as etch block not required. Further, no dimensional deformation from baths and process steps occurs.

The apparatus includes efficient use of incident laser light. Use of the process and apparatus can occur in large open areas with easy direction of light into nozzle openings. Further, since precision located images form the patterning, specificity of etch eliminates thermal damage to unpatterned substrate. Configuration of the ink jet nozzles occurs at actual size; there is no need for photo-resolution of relatively large images to smaller images. The ink jet can be fabricated without limitations imposed by optical field size.

During the process, no surfaces other than the ablated areas of the nozzles are subjected to high fluences. It is thus seen that the method relates for the patterning of matrix of nozzles. Such patterning can occur on a substrate with controlled nozzle shapes and controlled center-to-center spacing. This can occur from a beam of coherent light of a specific frequency for producing at least one nozzle array on a substrate. Laser light incident on the CGH has relatively low fluence because of the CGH ability to concentrate light on the workpiece. High fluences can be generated on the workpiece without having high fluences on the mask.

Where high fluences must be used—as in the ablation of nozzles on a stainless steel substrate, the mask only (and possibly is not) is subjected to high fluences. Further, the process is capable of producing high fluences (>50 J/cm²) on the workpiece. Since the mask is uncoated, only bulk damage is an issue to the substrate is an issue. Further, since there are no optics between mask and workpiece, no intervening surfaces are present to br damaged. Further, bulk changes in the refractive index have no noticeable effect on image quality.

The masks containing the CGHs are capable of numerous configurations. For example, masks can be tiled up if larger field is desired.

BRIEF DESCRIPTION OF THE DRAWINGS

Other objects, features and advantages of this invention will become more apparent after referring to the following specification and attached drawings in which.

DESCRIPTION OF THE PREFERRED EMBODIMENT

This disclosure includes three primary sections. An apparatus for producing the inkjet nozzles, an optical plate containing the computer generated hologram (here after CGH) used in the apparatus and process, and the production process for producing the nozzles.

Figure 1A:
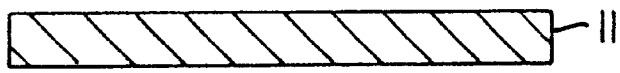
FIGS. 1A–1F illustrate the prior art process steps when double sided photolithography is utilized in nozzle manufacture.
Figure 1B:
Figure 1C:
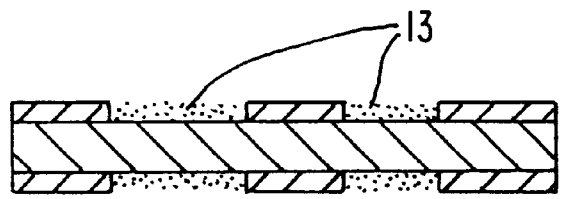
Figure 1D:
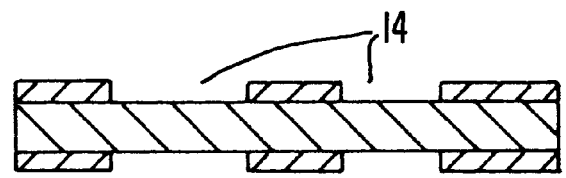
Figure 1E:
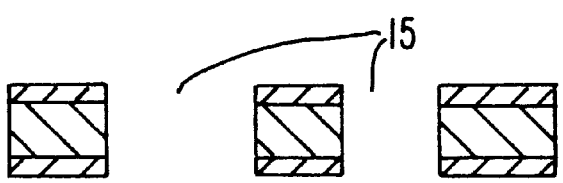
Figure 1F:
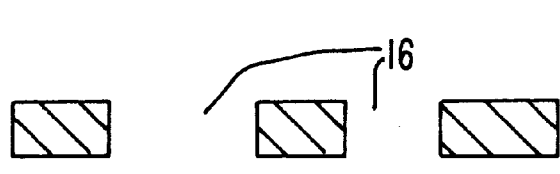
Figure 2A:
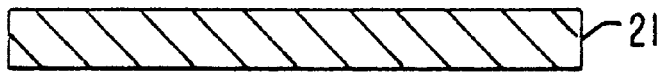
FIGS. 2A–2J illustrate the prior art process steps when conformal masks are used in nozzle manufacture.
Figure 2B:
Figure 2C:
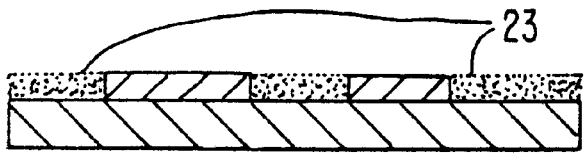
Figure 2D:
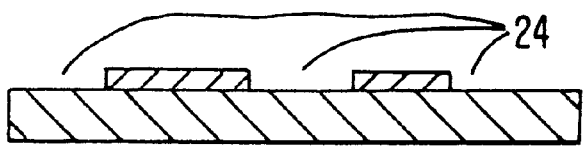
Figure 2E:
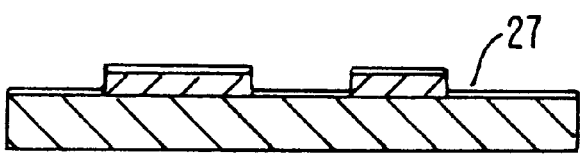
Figure 2F:
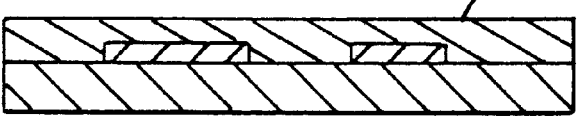
Figure 2G:
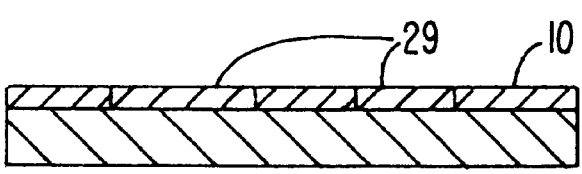
Figure 2H:
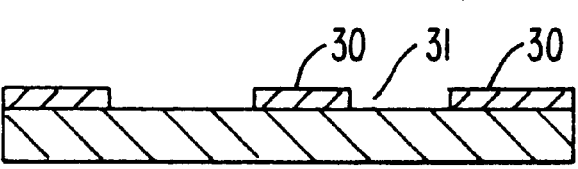
Figure 2I:
Figure 2J:
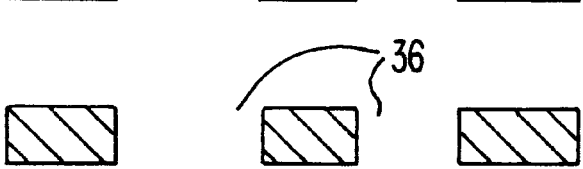
Figure 3A:
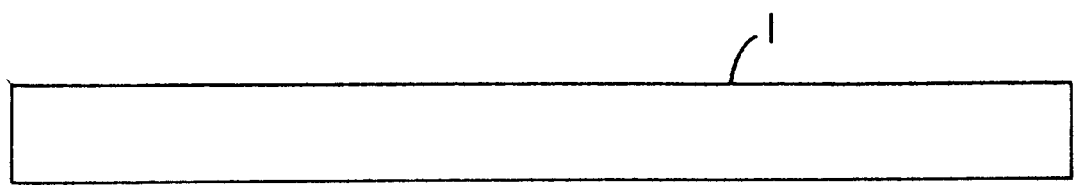
FIGS. 3A–3B are view of the substrate on which ink jet holes are configured with the single process step involved in nozzle manufacture when the present invention is used.
Figure 3B:
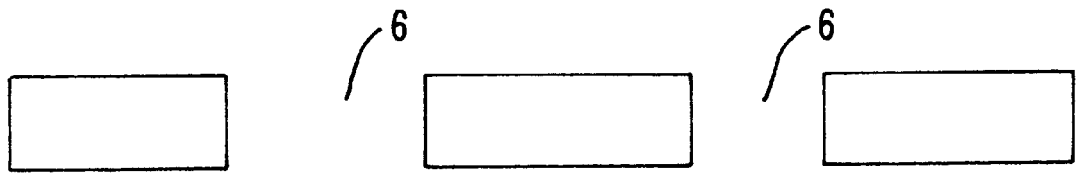
Figure 4A:
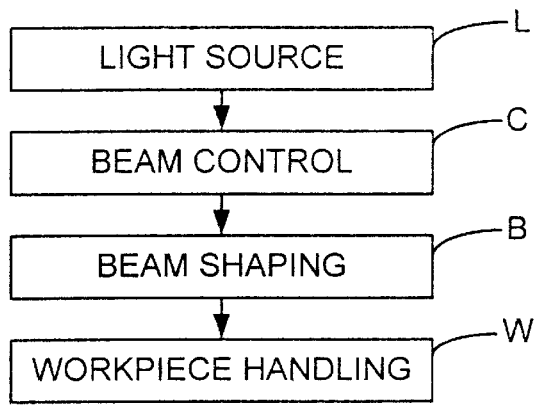
FIGS. 4A and 4B are block diagrams of the several apparatus functions utilized in the apparatus of this invention.
Figure 4B:
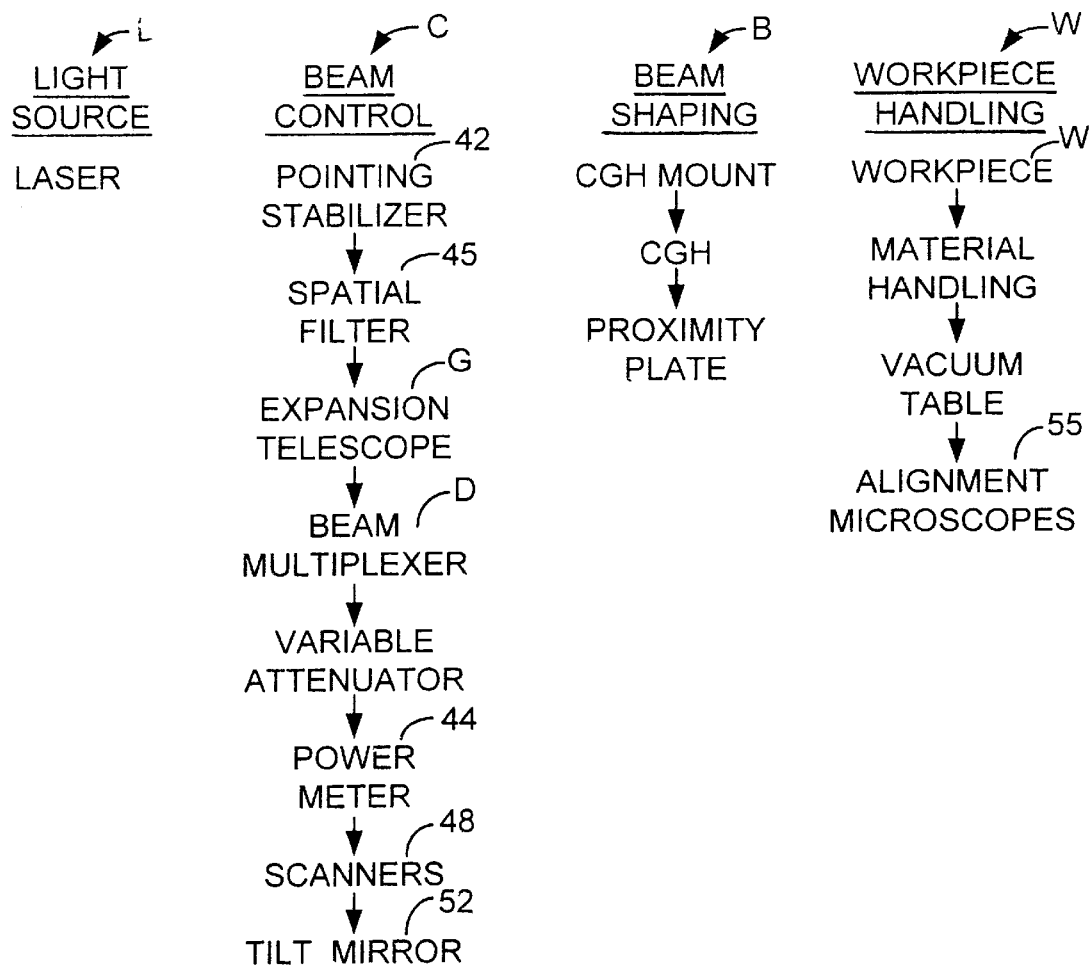

FIG. 4A is a block diagram of the apparatus functions with FIG. 4B illustrating the discrete categories of functions undertaken. A coherent light source L which produces a beam that is modified and monitored as necessary by the beam control system C. The beam is then shaped by beam shaping system B so as to form the desired working image on the workpiece. This image produces by the process of ablation, thermal action or other physical mechanism the desired nozzle shape. The workpiece is manipulated and controlled by the workpiece handling subsystem W. Details of each of these blocks is contained in FIG. 4B. FIG. 4B is best understood with reference to FIG. 5.

Figure 5:
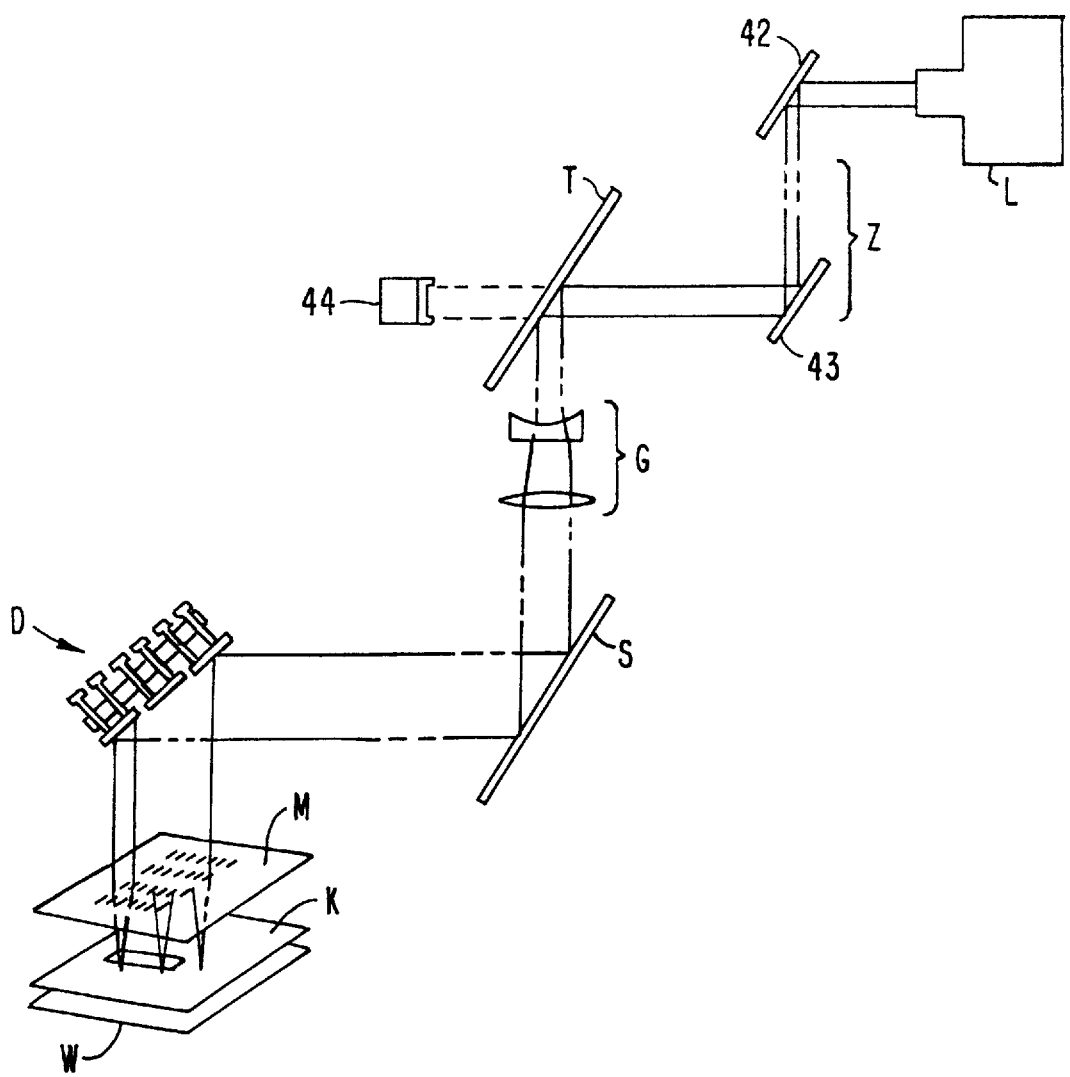
FIG. 5 is a schematic drawing of the apparatus of the present invention.

FIG. 5 is a schematic diagram of the tool. A laser L is aligned to the tool optical Z axis by means of a Z-path mirror pair. Turning mirror T allows the laser beam power level to be monitored by power meter 44, the results being used to regulate and maintain laser L at a constant power level. Next, Galilean telescope G expands the beam and collimates it, thereby improving focus. Scanner S then provides for parallel transport of the collimated beam along a single transverse X direction while beam division device D both scans in the other transverse axis Y and divides the beam up into spatially separated but parallel components. A coarse blocking mask K is used to capture undesirable diffraction orders, and the resulting image is projected onto the workpiece W.

Figure 6:
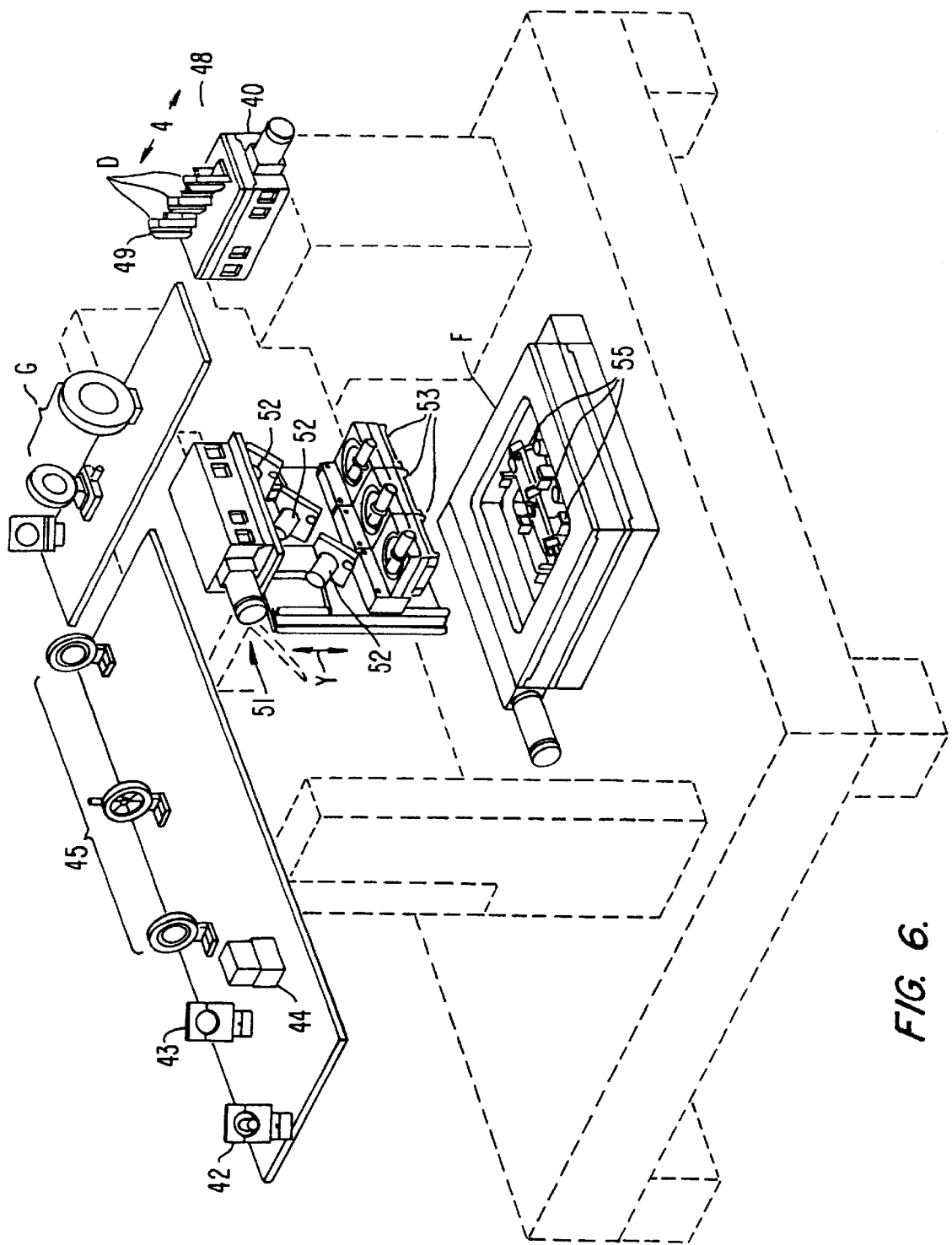
FIG. 6 is a perspective schematic of apparatus for discreet part handling and small scale reel handling.

Referring to FIG. 6, an apparatus appropriate for processing discrete parts or small scale reel handling is illustrated. A KrF excimer laser (not shown in FIG. 6) is operated in an energy stabilized mode so the process results will be repeatable. The laser L (See FIG. 5) beam is initially incident on mirror 42 whose tip and tilt is controlled by means of piezos or linear motors. Beam splitter 43 then sends off a small portion of the beam where power and angle of propagation is measured in housing 44 which contains a power meter, and associated optics and quadrant cell for angle detection. This information is processed by the tool's computer to produce correction signals for both the laser operating voltage and the tip/tilt actuator on mirror 42. Next a spatial filter assembly 45 removes the higher angle components (>1 mrad). A Galilean expansion telescope G then blows the beam up a factor of 4× and collimates it. Next, a beam division device and scanners 48 breaks the beam up into multiple separate spatially separated channels in the X direction for processing multiple parts simultaneously. Scanner S includes X-axis scanner 48 and Y-axis scanner 51. The separate, scanned beams are then incident on separate parts of a CGH on phase mask M. The beam division device D in this example consists of three separately mounted mirrors 49 offset from one another. Scanner S provides for parallel transport of the beam in the X direction at 48 and Y direction at 51. Next, mirrors and beam scanners identically configured as 48 only upside down and now each mirror can have it's tip and tilt varied allowing for fine, rapid control of the positions of each working image produced on the workpiece. Mask holders 53 allow for independent rotational control of the separate CGH plates for purposes of alignment. The discrete parts or small reel are held by an open frame table F which coarsely positions the workpiece.

Underside microscope/cameras 55 are set up to view alignment marks on the work surface, the result being processed by a machine vision system to determine the settings of tilt actuators 52 and rotation stages 53 required for fine image positioning. For discrete part handling with opaque substrates, microscope/cameras 55 would be located above the workpiece surface.

Figure 7:
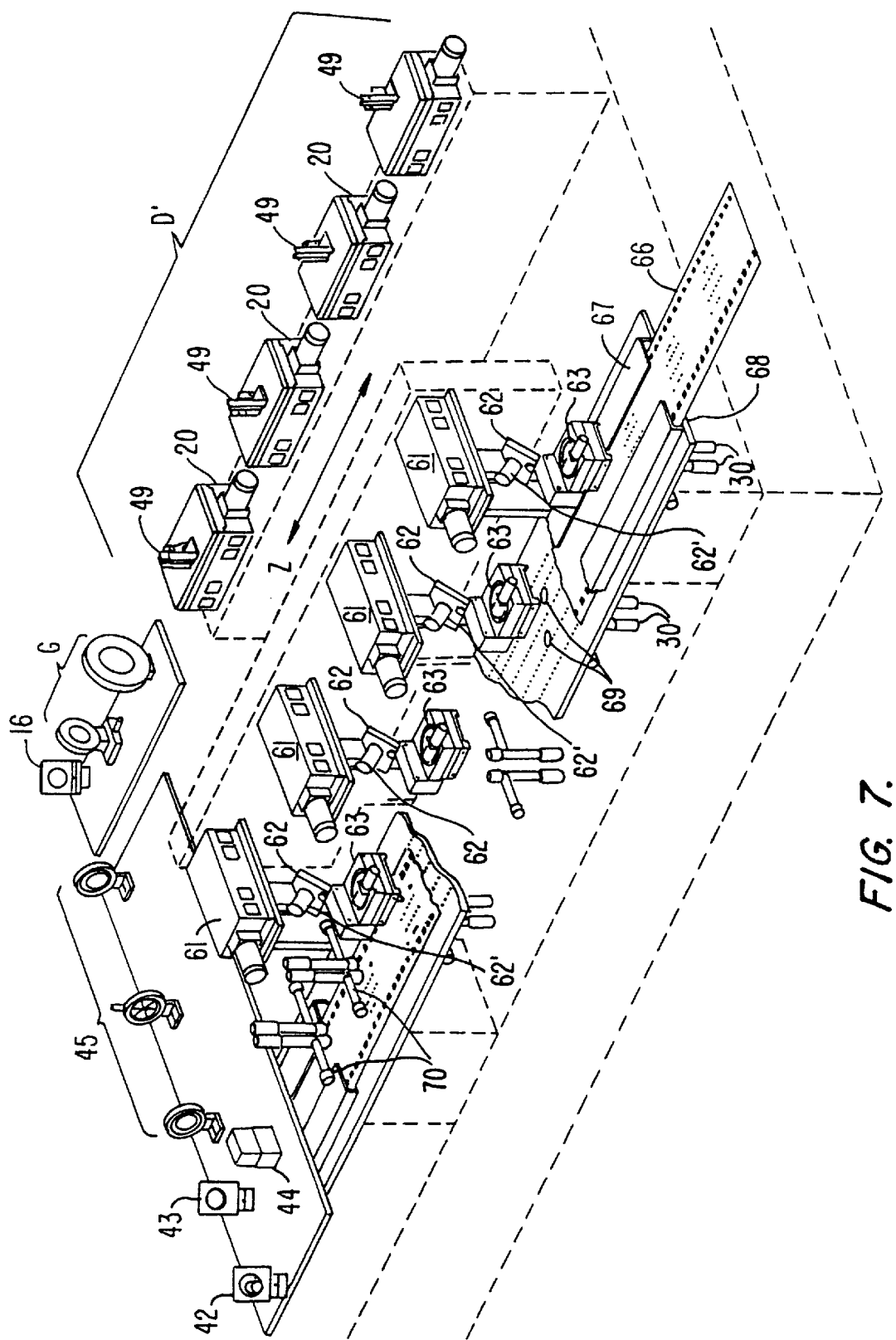
FIG. 7 is a perspective schematic of a tool configuration for continuous reel handling.
Figure 9:
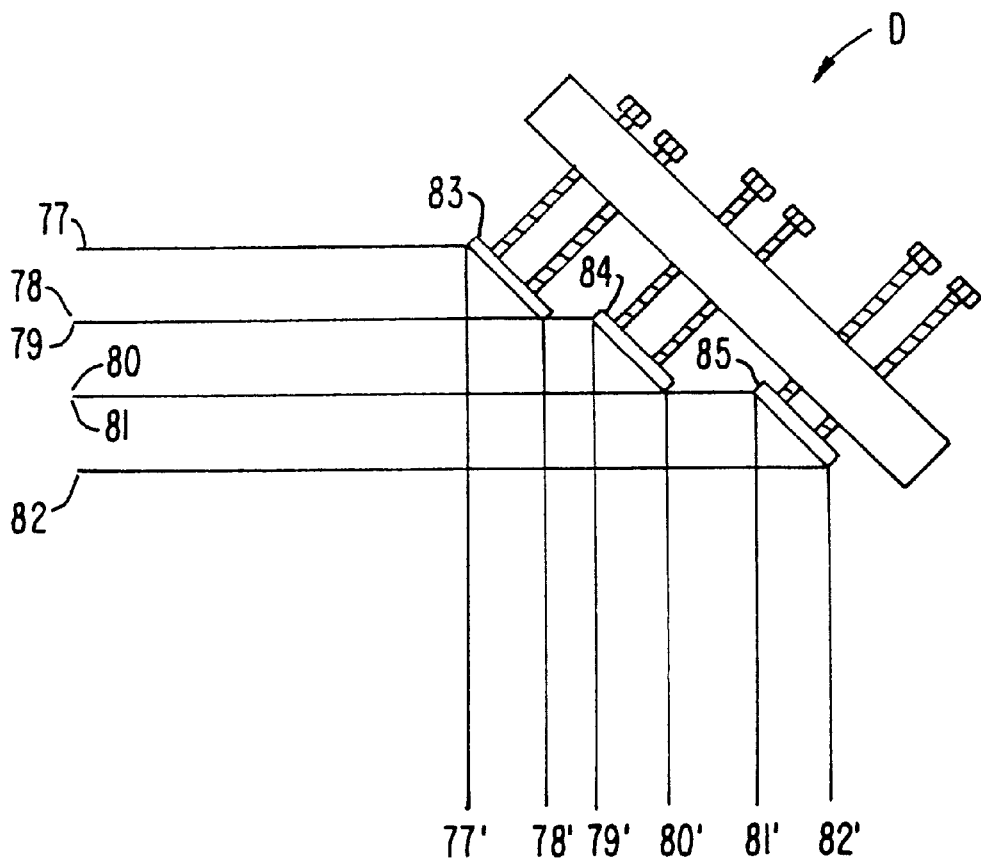
FIG. 9 details the action of a simple beam division or beam multiplexing device.

FIG. 7 is an embodiment of the apparatus appropriate for processing continuous material in reel format. The function is identical to FIG. 6 until we get to the X beam scanner/beam division assembly D'. There the mirrors 49 are mounted on separate scanning stages 60 and offset from one another perpendicular to the beam to achieve the beam division function. They are also staggered along the beam propagation direction Z for purposes of mechanical layout. Next, and unlike FIG. 6, the Y axis scanners and beam division consists of separate scanners 61 staggered in the Z direction. While in this arrangement, mirrors 49 and 62 are simple plane mirrors, if further beam division is required, they could be monolithic beam dividers such as illustrated by FIG. 9.

Next, the beam is incident on the CGH which is held in hologram holder 63 that is capable of small, rapid rotational adjustments. The beam is next incident on tape 66 on which the nozzle pattern is made. The tape is confined by guideways 67 and held flat during patterning by vacuum table 68. Holes 69 in the vacuum table are at the approximate location of alignment fiducials associated with each pattern. Through these holes, underside microscope/cameras 70 view the fiducial and the image is processed with pattern recognition software which locates the fiducial and generates a correction signal for mirror actuators 62'. In addition to producing the nozzle pattern, the CGH also produces a non-functional fiducial via which should align with target structures on the tape 66 if the registration were perfect. The offset of these fiducial vias from the underlying target structure is an indication of misregistration and is detected with topside microscope/camera combinations 70. Image processing software computes the offset from perfect registration which is then used to subsequently correct registration.

Figure 8:
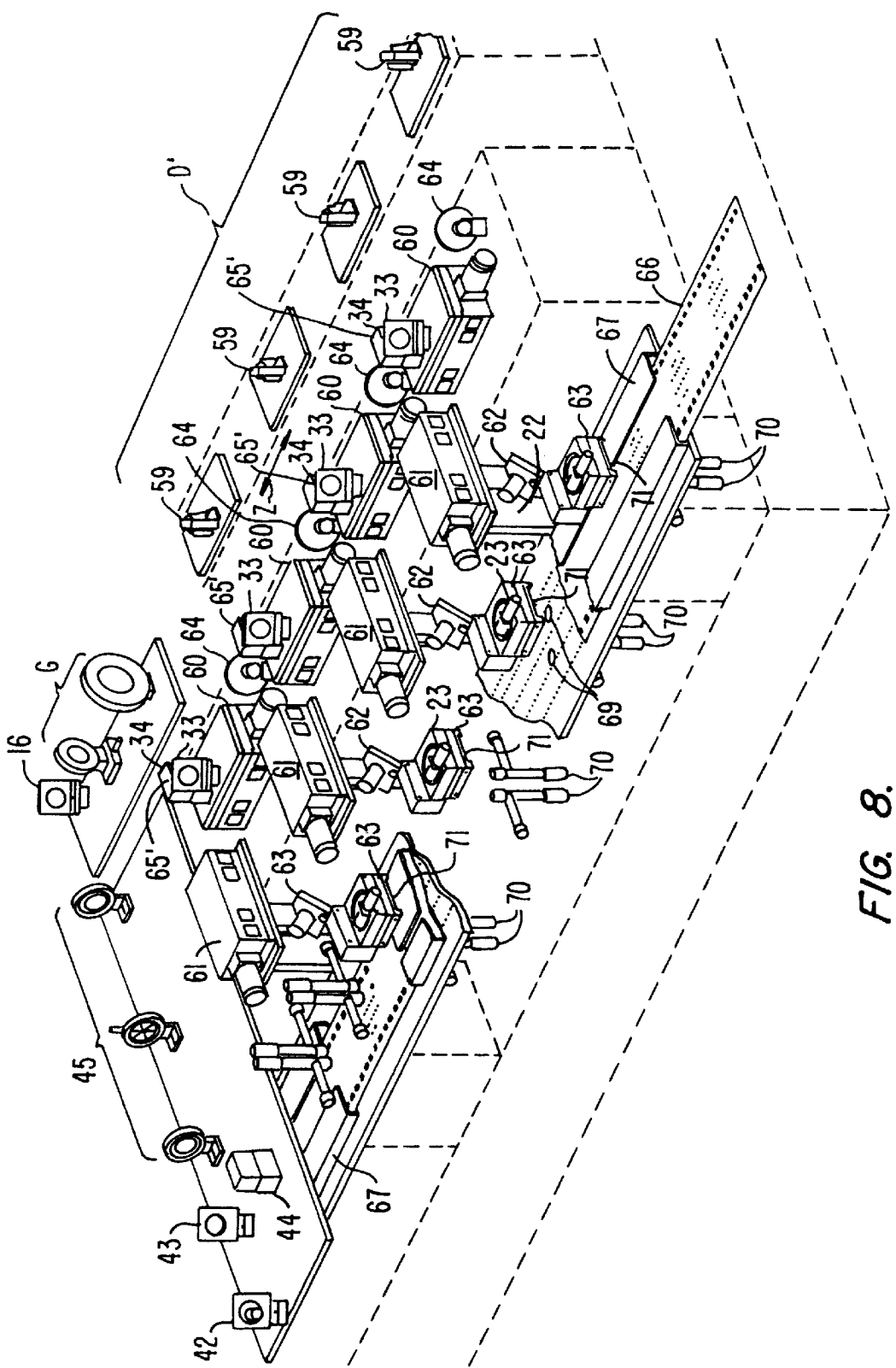
FIG. 8 is another perspective schematic of a tool configuration for reel handling.

FIG. 8 is an embodiment of the apparatus appropriate for processing continuous material in reel format. This form is appropriate when the power level in each channel needs to be controlled separately. The function of it's elements is identical to FIG. 7 until we get to the X beam division assembly D'. The beam division is done in a manner similar to FIG. 7 but now the beam division function in X is separate from the X scanning which is done further down the path by scanners 60. Next, the light hits variable attenuator 64. This attenuator is reflective and divided up into angular sectors with different reflectivity. Turning mirror 65 reflects 98% of the incident light, the remaining 2% being transmitted to power meter 65'. Power meter 65' provides the feedback necessary for operating variable attenuator 64. The subsequent components are the same as in FIG. 7 except for proximity plate 71. It is ~5 mm above the workpiece has openings for the nozzle rows being shot, the purpose of this plate is to catch the stray, unwanted diffraction orders. It is not essential for operation since the only consequence of the stray orders is to possibly create some very shallow (~1 micron) random patterns in polyimide tape.

The workpiece W (See FIGS. 14 and 15) consists of metal patterned polyimide on 35 mm tape format so that standard film reel technology can be utilized for the web handling. On the underside of the workpiece, fiducial marks U laid down during the metal patterning step are used as alignment marks by multiple cameras arrayed underneath the vacuum table that supports the workpiece and web handling equipment. The web advances at each cycle so that the fiducials sit on oversized holes in the vacuum table, each one being viewed by an imaging system. There is one imaging system for each alignment mark, each imaging system consisting of a microscope objective, camera, frame grabber, image processing board and software. They are linked together through a central control system which computes the appropriate actuator commands required for registration.

Some remarks can be made about laser L. It is preferred to use a long pulse excimer (>10 round trips in cavity), unstable resonator, with good beam quality at high repetition rates. To maintain high up times, it is preferred to have a second excimer laser ready to be switched in while the first undergoes maintenance or repairs. Typically, a KrF excimer laser is operated in an energy stabilized mode so the process results will be repeatable. Other lasers such as YAG, doubled YAG, copper vapor, or C02 can be utilized with this technique.

In FIGS. 6–8, mirrors 42, 43, and power meter and quad cell 44 maintains the optical axis of the coherent source. Mirror 42 can be operated with a piezo or possibly linear motors can be utilized for this function. Feedback comes from a quad cell. The function of the pointing stabilizer is to maintain the direction of propagation of the laser beam. Variations in laser beam pointing direction translate directly into mispositoning of the working image on the workpiece W.

Spatial filter 45 consists of lens-aperture-lens. This could also include a long distance propagation between paired apertures. This latter arrangement may be appropriate if the laser is located some distance from the rest of the tool. The purpose of the filter is to remove high angle light (typically >1 milliradian in an excimer). The result of spatial filtering is higher quality nozzles. The spatial filter is unnecessary for a bright enough source. Bright enough means that there is no high angle light and remaining light is low angle.

Galilean telescope G expands beam reducing fluence and decreasing beam divergence. Errors in beam collimation are removed by it. We have here depicted two discreet lenses, but for flexibility telescope G could be a turret with different magnification or expansion ratios that can be quickly switched into place or a continuously or discretely adjustable zoom lens, the different adjustments allowing for different expansion ratios. Although only a 2-lens telescope is depicted, multi-element configurations containing reflective and refractive components are also possible.

Beam division device D is illustrated in different forms in FIGS. 5, 6, 7, 8. It is also called beam multiplexer. The purpose is to take a compact, collimated beam and divide it up into a number of or parts, retaining collimation and spatially separating them. The form here illustrated consists of discrete mirrors staggered so as to intercept separate portions.

FIG. 9 illustrates the action of a simple beam divider device D. An incident beam represented by rays 77, 78, 79, 80, 81, 82 is incident on beam division device D. Rays 77, 78 and all the unidentified rays in between hit mirror 83 and after reflection form contiguous beam 77'–78'. Rays 79, 80 are similarly reflected by mirror 84 and upon reflection form contiguous beam 79'–80'. However, now instead of being directly adjacent to beam 77'–78', it is transversely separated from it by a gap whose size is determined by the arrangement of mirrors in beam division device D. In the same manner, rays 81–82 are spatially separated by the beam division device forming beam 81'–82'. This arrangement can be repeated in 2 directions. Also can be repeated within each channel.

FIG. 8 specifically illustrates fine control of each channel's average power. Power in each channel varies because of spatial non-uniformities in beam after beam division. Such control is not necessary if power in each channel is uniform enough. Fine control of a channel's average power is provided by motor controlled differentially reflective dielectric coatings between adjacent pieces of rotatable glass as function of rotational position.

A variable tilt mirror—such as mirror 62 of FIG. 8—will be attached to the last scanning mirror. This variable tilt mirror can be used for fine positioning of the projected pattern. It is typically driven by a very fast, very accurate piezo electric device or devices.

Scanners S are typically high speed, low angular jitter, small travel for this application because of small mask size. Small low mass mirrors are utilized. This is at least part of the reason for many separate broadcast channels.

Figure 10:
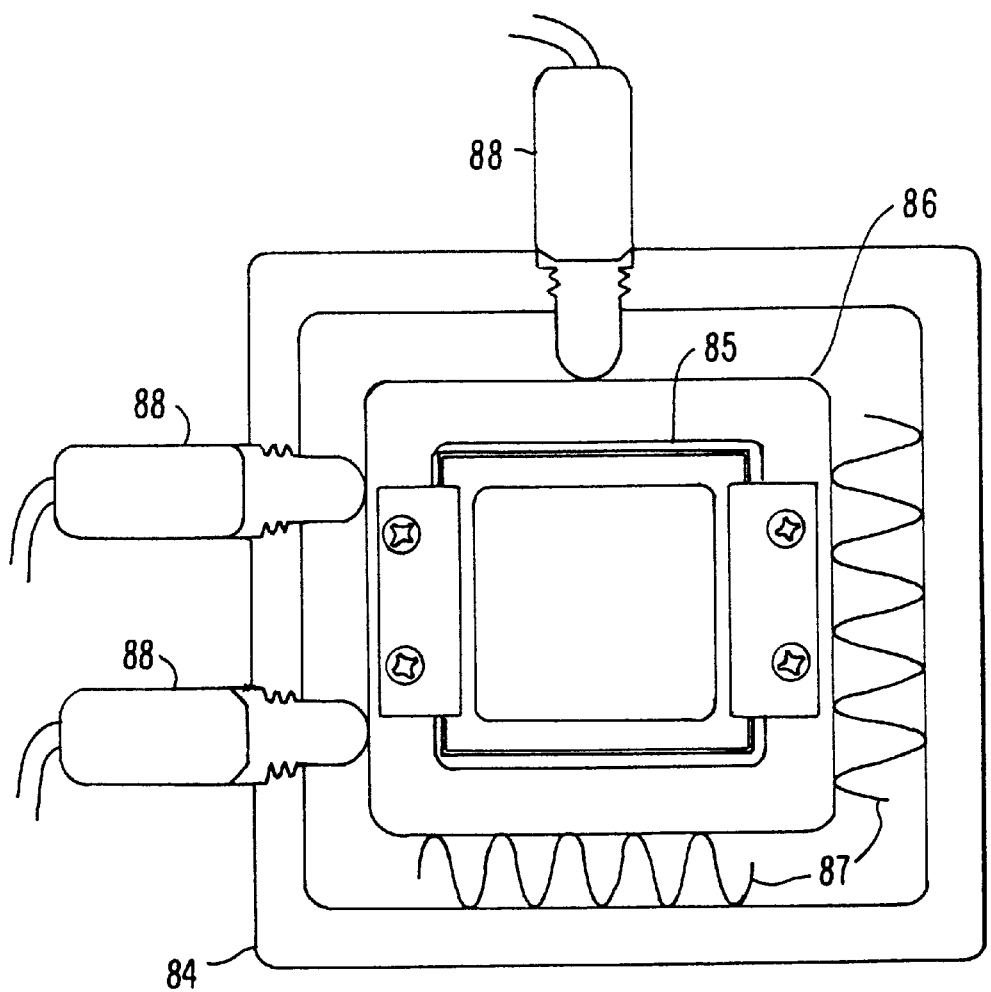
FIG. 10 details a mount for mounting a plate containing the computer generated holograms (CGHs) utilized for creating the array of ink jet holes.

Referring to FIG. 10, a computer generated hologram (CGH) mount can be seen. This mount includes limited rotational motion, which is very accurate and very fast. Rotational motion around center of mask is achieved with three linear actuators. CGH is mounted in a leaf spring arrangement 87. The unit is preferably capable of translation of the CGH. It will however be understood that rotation only is preferred.

In FIG. 10, a CGH is held rigidly in metal frame 86 which is laterally held in place with leaf springs, 87, and linear actuators, 88. The linear actuators push in 1 direction providing rotation, while the leaf springs force holder 86 to remain in contact with linear actuators 88 at all times.

In FIG. 8, a proximity plate 71 is utilized. This plate forms an aperture which immediately surrounds the real image produced from the CGH. This plate 71 function to catch the higher order light from the off axis hologram arrangement.

As will here after be more completely understood, we can generally only do one row of nozzles per 2/row array although single rows on multiple nozzle arrays can be simultaneously processed. This being the case, openings over the row of nozzles can be utilized as the required stops. This plate is unnecessary if the higher order light does not damage the workpiece by itself or if the higher order light does not furnish sufficient interference to sufficiently degrade the image of light of the order of interest.

Workpiece W can be of polyimide, or other plastic. Substrates in 35 mm format are preferred. Where stainless steel is used, it is in a ribbon format. The correct thickness and ablative characteristics need to be understood to obtain the correct nozzle shape. The required ablation can occur in a vacuum or helium environment if polyimide debris a problem.

The web speed of advance is chosen for speed with modest accuracy. Standard technology can be utilized for the strip advancement if film format like 35 mm or 65 mm is utilized. Web advancement is not used where discrete piece materials are utilized for the substrate S.

Workpiece fiducial U (see FIGS. 14 and 15) are utilized. At least two electrically nonfunctional crosses are preferred. Two such fiducials U are utilized with each site.

Figure 13A:
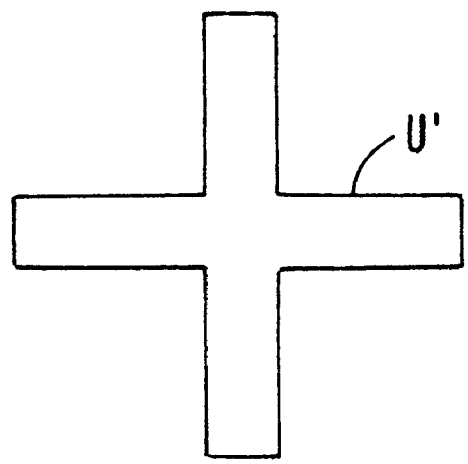
FIG. 13 illustrates verification fiducial and fiducial vias as arrayed on a workpiece.
Figure 13B:
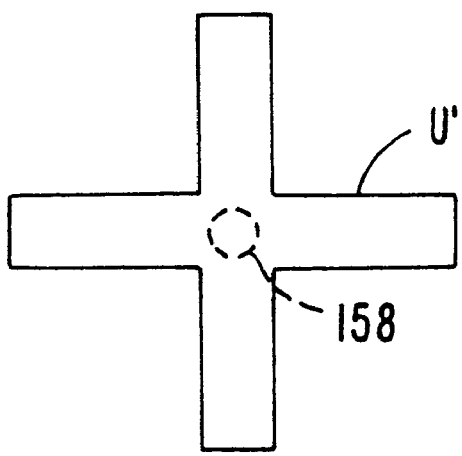
Figure 13C:
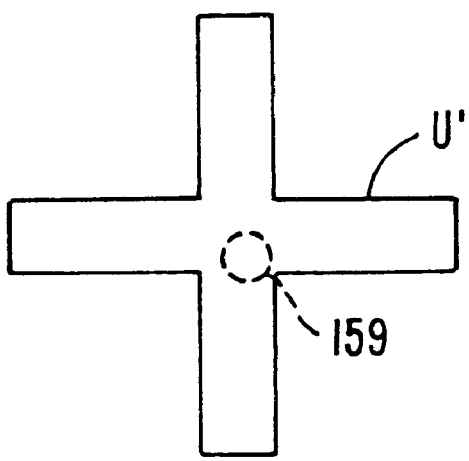
Figure 14:
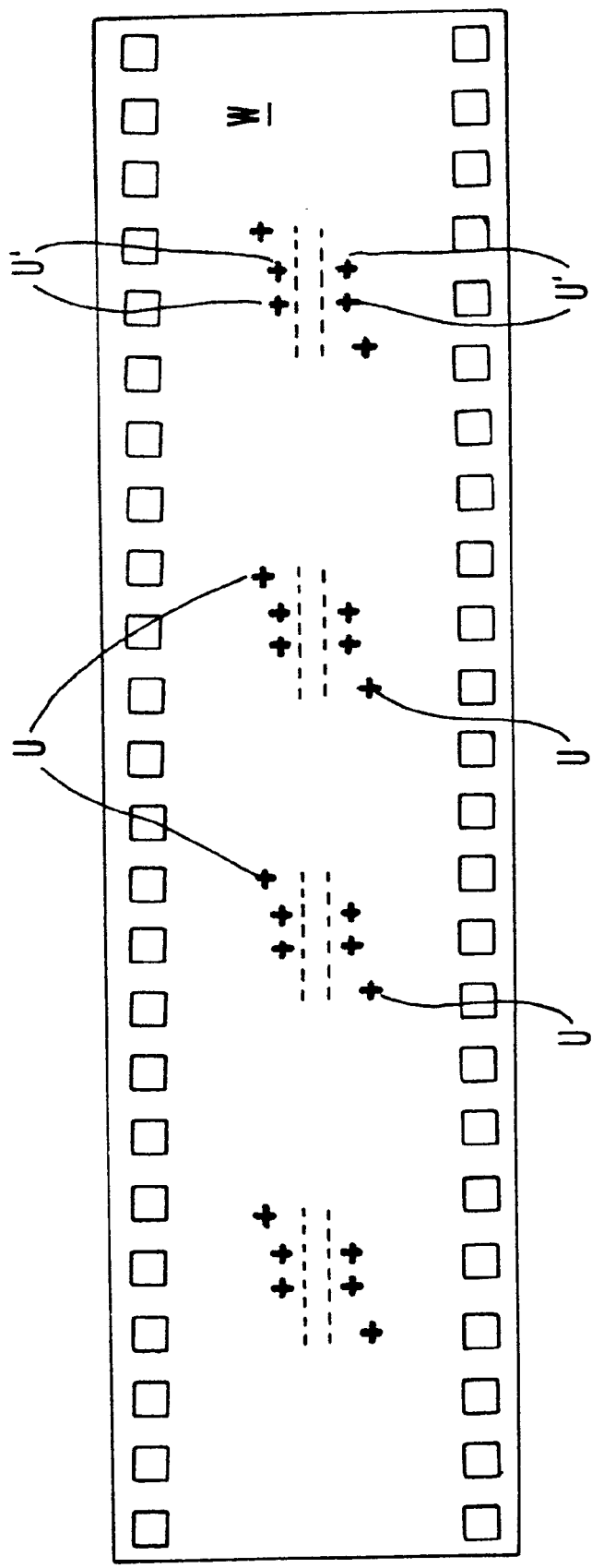
FIG. 14 is one form of nozzle layout in a tape format.
Figure 15:
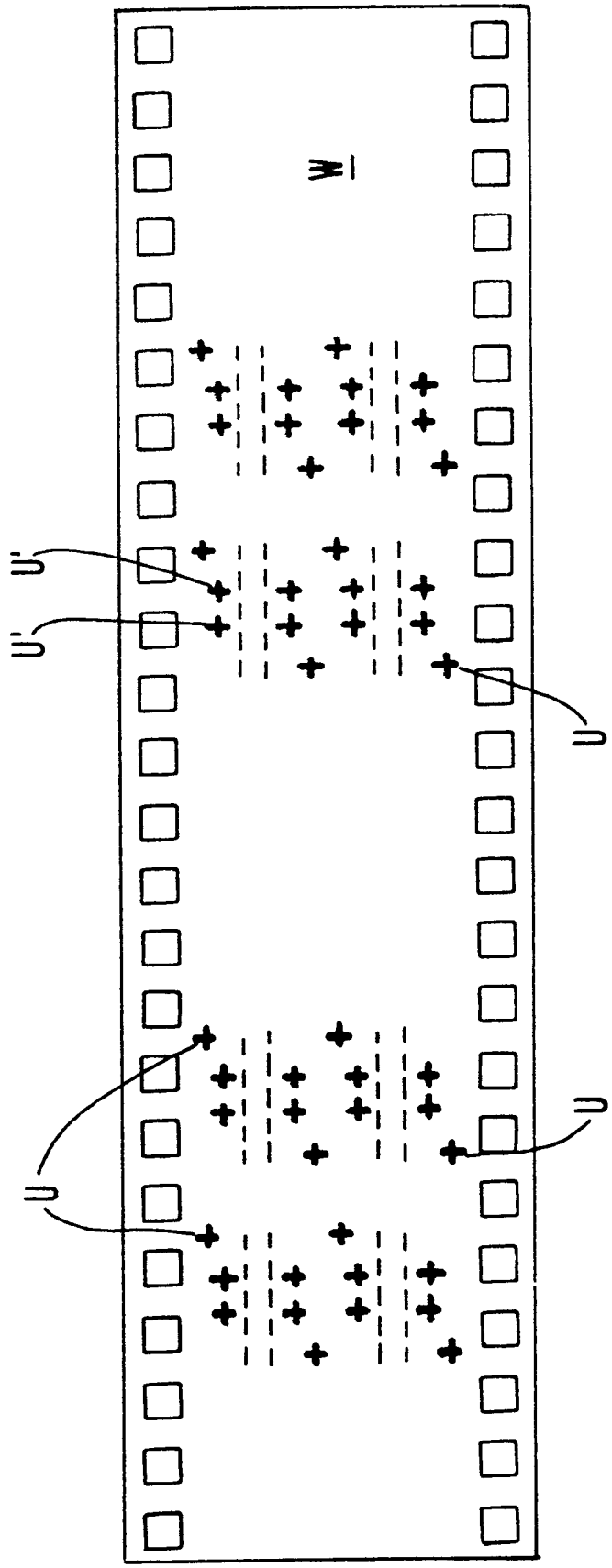
FIG. 15 is another form of nozzle layout in tape format.

A vacuum table is utilized. This table holds down film or sheet material. Holes to see alignment marks when viewed from underneath are utilized for access to the fiducial U. Software controls can be used to assist alignment. This can include microscope/camera systems, preferably having long wide angle microscopic objectives with CCD cameras, frame grabber and imager processor for each channel utilized. An inspection systems can include imaging systems, a short distance downstream from the last working CGH on a mask M. Such a system would measure the position of the verification fiducial U' relative to verification via 158 to determine nozzle registration to the workpiece. This is illustrated by FIGS. 13, 14, 15.

The optical plate is a computer generated hologram, typically produced by E-beam etching on a suitable glass such as quartz. The CGH is capable of holding the patterns for many nozzle arrays and produces an image on the workpiece with very accurate nozzle to nozzle spacing. This is useful if the substrate is sufficiently dimensionally stable that multiple nozzle arrays can be simultaneously registered. When the workpiece is not stable, we must use multiple plates, each one individually registered to the workpiece. The exact intensity profile constituting the working image can be precisely varied to produce desired wall slope. Because the CGH enhances the light intensity, it can create very high peak intensities (>10 gigawatts/cm$^2$ over a 10 nanosecond pulse) on the work surface. Furthermore because of flexibility in workpiece location, if there is known topography or curvature associated with the workpiece, it can be taken out in the CGH design.

The plate is a computer generated hologram which takes a collimated, coherent beam of light and forms an image on a workpiece, the intensity profile of the image patterning the material. The plate can operate in reflection or transmission, but transmission is the preferred mode. The precision of the projected pattern is high since it is created with electron or photon beam direct write, semiconductor lithography tools with accuracies better than 0.5 microns. Three types of intensity profiles are created by the plate, nozzles, fiducial vias and alignment fiducial.

The nozzle patterns on the CGH are the critical part of the mask. They directly control the placement, wall slope and to a great degree the quality of the final product.

The plate is a subaperture broadcast computer generated hologram like those described in USE OF FRESNEL ZONE PLATES FOR MATERIAL PROCESSING, now U.S. Pat. No. 5,362,940 issued Nov. 6, 1994 Continuation of Ser. No. 07/940,008 filed Sep. 3, 1992, which was a File Wrapper Continuation of Ser. No. 07/612,212 filed Nov. 9, 1990, now abandoned and GENERALIZED GEOMETRIC TRANSFORMS FOR COMPUTER GENERATED HOLOGRAMS U.S. patent application Ser. No. 08/175,052, filed Dec. 22, 1993, all incorporated herein by reference.

Having determined the intensity profile required to generate the nozzle wall shape (see nozzle shape control below), it is back propagated in accordance with the above references to determine the phase and amplitude modulation required by the plate to induce in the incident wavefront. The phase and amplitude profile on the plate could also be determined by the method of Gerchberg-Saxton as set forth in "Reconstruction and Synthesis Applications of an Iterative Algorithm", J. R. Fienup, SPIE vol. 373, pg 147, 1981 or the algorithm of simulated annealing, or any other appropriate technique. Back propagation is preferred.

Having determined the plate amplitude and phase modulation, it is necessary to check that the individual intensity profile generated for a nozzle does not result in excessive interference with adjacent nozzles resulting in misshaped nozzles. That is, it is essential that any optical proximity effects are reduced to a negligible level at this stage of the design process.

Typically, this phase and amplitude modulation is impressed on the +1 diffraction order. The other diffracted orders do not form a useful working image in the usual case. In fact, electromagnetic interference effects from other, unused diffraction orders can result in misshaped nozzles. The solution to this latter problem utilizes the technique of off axis or carrier frequency holograms discussed in "Binary Synthetic Holograms", W. Lee, Applied optics, vol 13,no 7, pg 1677, July 1974; and, "Optical Holography", R. Collier, C. Burckhardt, L. Lin, Academic Press.

Figure 11:
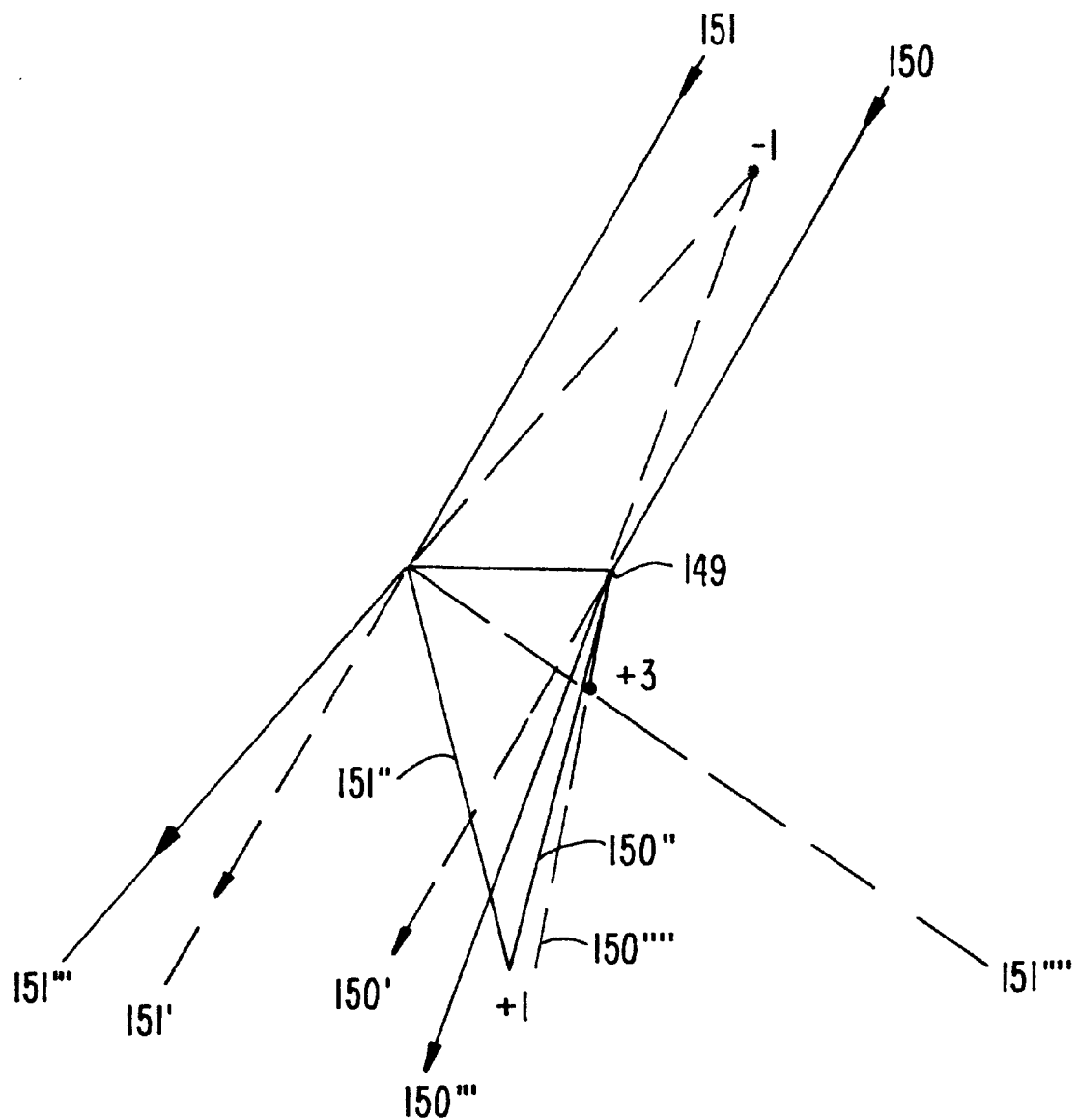
FIG. 11 details the operation of an off axis or carrier frequency hologram illustrating the dispersion of optical orders away from the working image of interest.
Figure 12A:
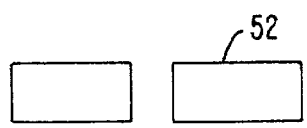
FIG. 12 illustrates a variety of nozzle shapes in cross section which can be accomplished with the present invention.
Figure 12B:
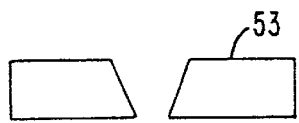
Figure 12C:
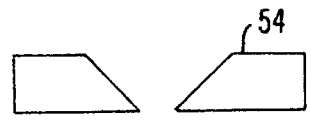
Figure 12D:
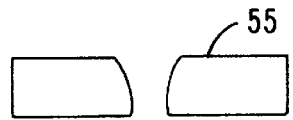
Figure 12E:
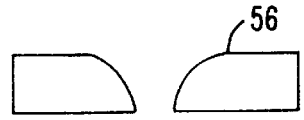

FIG. 11 illustrates the action of an off axis hologram 149. In this case, the intended working image of the CGH is formed by the +1 order and is represented by the point, +1. Incident collimated, coherent light 150, 151 passes through prism P and hits hologram 149 at an angle. As will be seen, this angle is selected so that the working image from the order of interest—here the first order—is formed at a location where the remaining orders do not interfere with the generated image. Selection of the prism is made so that incidence on hologram 149 effects this result.

In the illustrated example, the 0 order passes straight through and is not deflected at hologram 149. This light is modulated in amplitude to form image 150'–151' in the image plane. Another portion is diffracted into the +1 order as rays 150"–151" and focuses to a spot (+1) in the image plane. The −1 order is represented by rays 150'", 151'" which diverge from virtual point source −1, located before hologram 149. Light scattered into the +3 order is represented by rays 150"", 151"" which forms a real focus just before the image plane, and diverges thereafter. Other orders are diffracted in a similar manner but a property they all share is that provided the net optical tilt introduced into the incident beam 150, 151 by CGH 149 is larger than arctan (D/2z) where D is the CGH diameter and z the workpiece to CGH distance then these orders do not overlap with the image +1.

The significance of this fact is that since the nozzle array is approximately in the form of a row, we can replace simple focusing CGH 149 with one that forms the working image of a single row of the nozzle array, the carrier frequency being in a direction perpendicular to the long direction of the nozzle row. Thus, if CGH 149 produced a row of nozzles, the nozzle row would be perpendicular to the plane of the page. The generalization of the above mentioned arctangent condition to the case of producing more complex images can be found in "Binary Synthetic Holograms", W. Lee, Applied optics, Vol 13, No 7, pg 1677, July 1974.

The previous discussion has incoming light 150–151 incident at an angle with respect to CGH 149. Alternatively, incoming light 150–151 can be normally or perpendicularly incident on CGH 149 but an optical wedge in contact with CGH 149 can provide the required beam tilt.

So that the working image is projected on the workpiece with as small angle as possible, the incident coherent light 150, 151 is incident at an angle determined by the CGH carrier frequency and such that on average, the light diffracted into the +1 order does not have any net tip or tilt associated with it. This is illustrated by FIG. 11.

Because the adjacent rows of nozzles are sometimes inconveniently spaced, it may occur that for technical reasons relating to minimum feature sizes on the hologram that two adjacent rows cannot be simultaneously patterned with a CGH as described above. In this case, a CGH designed according to the above plan can be used for each adjacent row separately; the difference being that only one row, and not it's close neighboring row, is patterned at a time, the rest of the patterning taking place during a subsequent operating cycle.

While the preferred plate architecture uses an off axis hologram for patterning individual nozzle rows, other techniques that sufficiently ameliorate or eliminate the undesirable interference from the other orders could be used in it's place.

The wall slope and precise shape is required for producing the desired ink flow pattern. FIG. 12 illustrates a variety of nozzle shapes. All of these different wall shapes are achievable and are the result of different intensity profiles incident on the workpiece. Techniques for the realization of these various wall shapes form the subject matter of another disclosure and are not intended to be fully covered herein.

Fiducial vias are utilized. These are not part of the pattern but are used to score the lateral alignment. They hit alignment crosses. FIG. 13 illustrates verification fiducial U' with some fiducial vias 158, 159 in them. Verification fiducials U' are isolated marks, crosses here, not part of the pattern which are used to get feedback on nozzle registration. The fiducial vias are shot at the same time the nozzle pattern is. The subapertures on the plate producing the fiducial vias are simple fresnel lenses or any other design deemed appropriate.

Alignment fiducials can be used for setup. These are lens combinations, described in the above referenced "Apparatus and Process for Using Fresnel Zone Plate Array for Processing Materials", which are used in setting up the CGH by allowing the correct plane for the plate to be rapidly determined.

The detailed description of the process of this invention can now be set forth. In the preferred configuration, the workpiece consists of metal patterned polyimide in 35 mm tape format so that standard film reel technology can be utilized for the web handling. On the underside of the workpiece, fiducial marks laid down during the metal patterning step are used as alignment marks by multiple cameras arrayed underneath the vacuum table that supports the workpiece and web handling equipment. The web advances at each cycle so that the fiducial sit on oversized holes in the vacuum table, each one being viewed by an imaging system. There is one imaging system for each alignment mark, each imaging system consisting of a microscope objective, camera, frame grabber, image processing board and software. They are linked together through a central control system which computes the appropriate actuator commands required for registration. FIGS. 14 and 15 illustrate 2 examples of nozzle layup in reel format.

The material of the substrate is typically in reel form. In the normal case, starting with polyimide nominally 2 mil thick which already has a side patterned with metal will be utilized. Included in the patterning are alignment marks visible from both sides of the polyimide. The material is nominally in 35 mm reel format so that it can be handled using standard 35 mm tape handling technology.

Tape advance occurs quickly, with a precision of ~0.005" in the takeup direction. The advance takes place once per cycle and places the alignment marks over openings in the vacuum table within the field of view of the imaging systems.

Position Sensing is used because of dimensional variations in the substrate. As supplied the tape can contain errors. Additionally, errors in reel advance can occur. The projected pattern must be reregistered at each step; sensing the position of each part relative to the projected pattern is therefore required.

Each part has 2 copper patterned fiducials U in proximity to the intended nozzle locations. These fiducials are visible from both sides of the tape. There are also additional fiducials used for feedback. Once the reel has advanced, these 2 fiducials become visible to the underside imaging systems. There is one underside imaging system per visible fiducial which uses imaging processing software to determine the mispositioning of the fiducial. The mispositioning vectors are computed from the imagery in parallel and sent to the main control computer.

Registration has two parts; operation and setup. Operation of the registration scheme is as follows. The positioning vectors from each image system align with position vectors from the feedback imagers and are used to calculate best fit in the X-Y and theta positioning for each part separately. The best fit translation is then used to calculate and then generate a signal controlling the tip/tilt of mirrors which displace the projected image the desired amplitude. The best fit rotation is implemented using the fast, small displacement theta stage attached to each CGH projecting a pattern. Setup of the registration is as follows. On the vacuum table, a precision reticle with alignment marks in the same shape and location as on the parts is used to position the underside imaging systems so they are centered within the field of view of each imaging system. This centering need not be perfect since we can take out small mispositions in subsequent positioning calculations performed on the parts. Next the CGH pattern is illuminated and in addition to the nozzles, vias are ablated onto other copper alignment marks. One such ablation occurs per cell and onto different sets of fiducial. These fiducials are then examined for coincidence with the fiducial via. Lack of registration is measured and the pattern translation and rotation are adjusted until coincidence is achieved. Examining the fiducials utilizes the feedback cameras.

The nozzles are thus machined using a computer generated hologram. The hologram is encoded with a carrier frequency which throws the image in a direction perpendicular to the line of nozzles. In operation, the light is incident on the CGH so that the image formed by the +1 order (the useful image) is not tilted on average. The carrier frequency is dictated by the need to separate the various diffraction orders from the +1 order and avoid interference effects which can cause irregularities in the resulting image. A loosely toleranced proximity mask places ~5 mm away from the workpiece can catch the undesirable orders, but generally this is unnecessary.

Either a full row (there are two parallel rows per part) or part of a row can be machined with each cycle. Thus, if a full row is machined, the entire part requires only 2 cycles to make. If only half a row is machined, then a full part requires 4 cycles to make. 4 cells are machined simultaneously in the preferred embodiment and the cycle time is 2 seconds. At the same time the nozzles are machined, the feedback fiducial are made. If debris resulting from machining is to be minimized, the ablation takes place in either a vacuum or helium environment.

It will be understood that where patterning (including ablation) of nozzles occurs on a continuous substrate, it is generally required that the substrate be a material that is not subject to expansion, contraction or other deformation either due to the patterning procedure itself or other effects—such a humidity ambient to the processing. Where numerous pattern are being repeated on the same substrate, it will be understood that the substrate utilized is not subject to deformation either by the patterning process itself or ambient conditions to the patterning process. For example, where nickel and stainless steel substrates are utilized, deformation of the substrate does not normally occur.

Rather than inspect for misaligned parts for acceptance, this system incorporates real time inspection. The current results are used in the registration system to correct the pattern translational and rotational offsets. Takeup is a standard 35 mm reel system.

The reader will understand that the apparatus here disclosed will admit of variation. This is especially important for the processing of certain materials. For example, it is contemplated that the following materials will be used with at least the respective following power levels for the production of arrays of nozzles. Polyamide requires a working image of about 0.1 joule/cm$^2$; silicon about 3 joule/cm$^2$; nickel about 10 joule/cm$^2$; and stainless steel about 30 joules/cm$^2$.

Further, it may be required for the patterning or ablation to occur within an atmosphere where corrosion and other chemical and physical deteriorations are prevented. Such atmospheres can include by way of example patterning of polyimide in either a helium atmosphere or a vacuum or stainless steel in either argon or a vacuum.

Further, we have shown Galilean telescope generally before the beam division optics and the scanning apparatus. Such beam division and scanning could as well take place before passage through the Galilean telescope.

What is claimed is:

1. In a method for ablation of a matrix of nozzles on a substrate with controlled nozzle shapes and controlled center to center spacing from a beam of coherent light of a specific frequency for producing at least one nozzle array on the substrate, said method including the steps of:

providing a plurality of masks, each said mask configured in a plane having a plurality of subapertures with each subaperture containing at least a portion of a computer generated hologram for producing converging coherent light of the specific frequency from the subaperture with image information from the subaperture to form a real image at a working distance from the mask having a profile for ablating the nozzles of specific shape and location on the substrate;

holding the substrate at the working distance from the masks;

holding the plurality of masks overlying the substrate to register the real images of the subapertures to the substrate to pattern the nozzles;

dividing the coherent light of the specific frequency into multiple beams with one the beam intersecting each mask at at least one subaperture; and, scanning the coherent light source of the specific frequency for simultaneously causing each said beam of the multiple beams at each said mask to simultaneously scan a plurality of subapertures at least along one direction in the plane of the mask to produce on the substrate nozzles.

2. In a method for the ablation of a matrix of nozzles on a substrate according to claim 1 and including the further steps of:

monitoring intensity of the coherent light of specific frequency.

3. In a method for the ablation of a matrix of nozzles on a substrate according to claim 1 and including the further steps of:

monitoring intensity of the coherent light of specific frequency at each the beam adjacent each the mask.

4. In a method for the ablation of a matrix of nozzles on a substrate according to claim 1 and including the further steps of:

dividing the coherent light of the specific frequency between scanning the coherent light source and the masks.

5. In a method for the ablation of a matrix of nozzles on a substrate according to claim 1 and including the further steps of:

dividing the coherent light of the specific frequency while scanning the coherent light source.

6. In a method for the ablation of a matrix of nozzles on a substrate according to claim 1 and including the further steps of:

providing coarse blocking means between at least one of the masks and the substrate for blocking light other than that light for producing the real image.

7. In a method for the ablation of a matrix of nozzles on a substrate according to claim 1 and including the further steps of:

incrementally advancing the substrate while holding the substrate whereby nozzles patterned on the substrate are incrementally advanced relative to the masks.

8. In a method for the ablation of a matrix of nozzles on a substrate according to claim 1 and including the further steps of:

holding the substrate with a vacuum.

9. In a method for the ablation of a matrix of nozzles on a substrate according to claim 1 and including the further steps of:

scanning the beams in two dimensions relative to the plane of the masks.

10. In a method for the ablation of a matrix of nozzles on a substrate according to claim 1 and including the further steps of:

rotating the masks for aligning the masks.

11. In a method for the ablation of a matrix of nozzles on a substrate according to claim 1 and including the further steps of:

provi ding spatial filter means between the coherent light source of the specific frequency and the masks for removing light having angularity from the beam of coherent light of the specific frequency.

12. In a method for the ablation of a matrix of nozzles on a substrate according to claim 1 and including the further steps of:

during the scanning step directing the coherent light of the specific frequency on the masks at an angle inclined to normal to cause light from the mask extraneous to the real image to be incident outside of the real image.

13. In a method for the ablation of a matrix of nozzles on a substrate according to claim 1 and including the further steps of:

providing at least one of the masks with subapertures for ablating the nozzles in a column.

14. In a method for the ablation of a matrix of nozzles on a substrate according to claim 1 and including the further steps of:

providing at least one of the masks having subapertures for ablating the nozzles in side-by-side columns.

15. In a method for the ablation of a matrix of nozzles on a substrate according to claim 1 and including the further steps of:

observing fiducials on the substrate for registration of the nozzles relative to the substrate.

* * * * *